July 29, 1969
I. DEL GAUDIO
3,458,675
SAFETY INTERLOCK FOR APPLIANCES
Filed Nov. 30, 1966
2 Sheets-Sheet 2
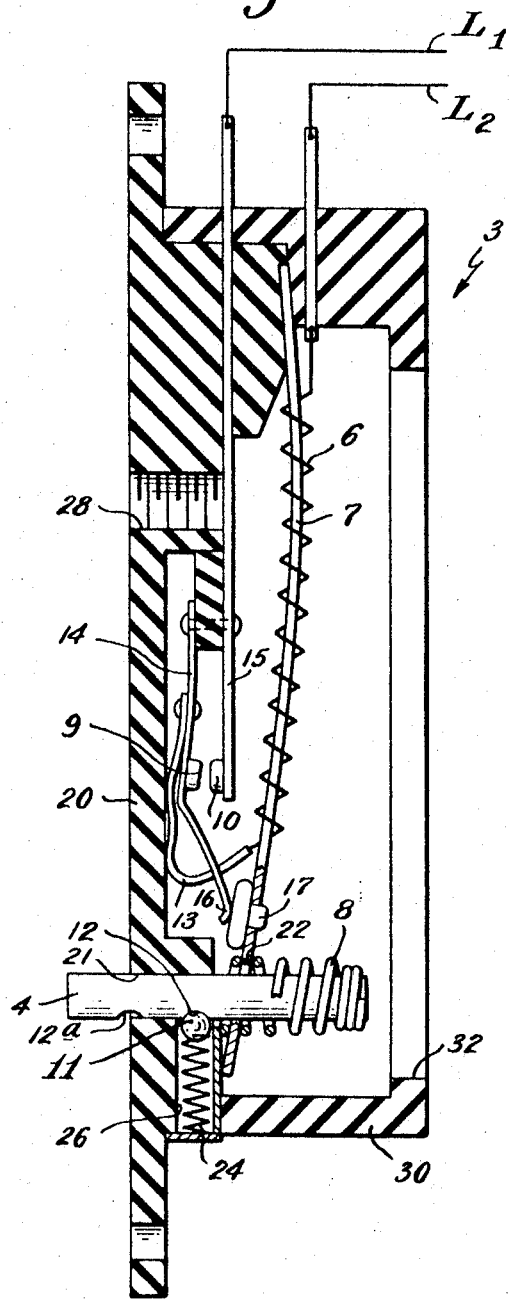
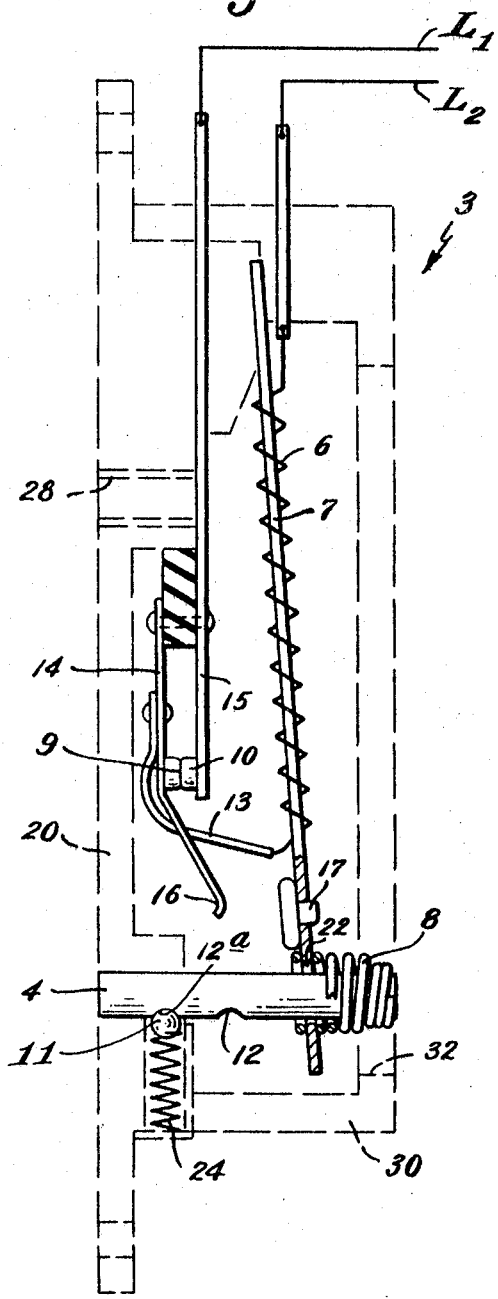
Inventor,
Italo Del Gaudio,
by John C. Haug Att'y.

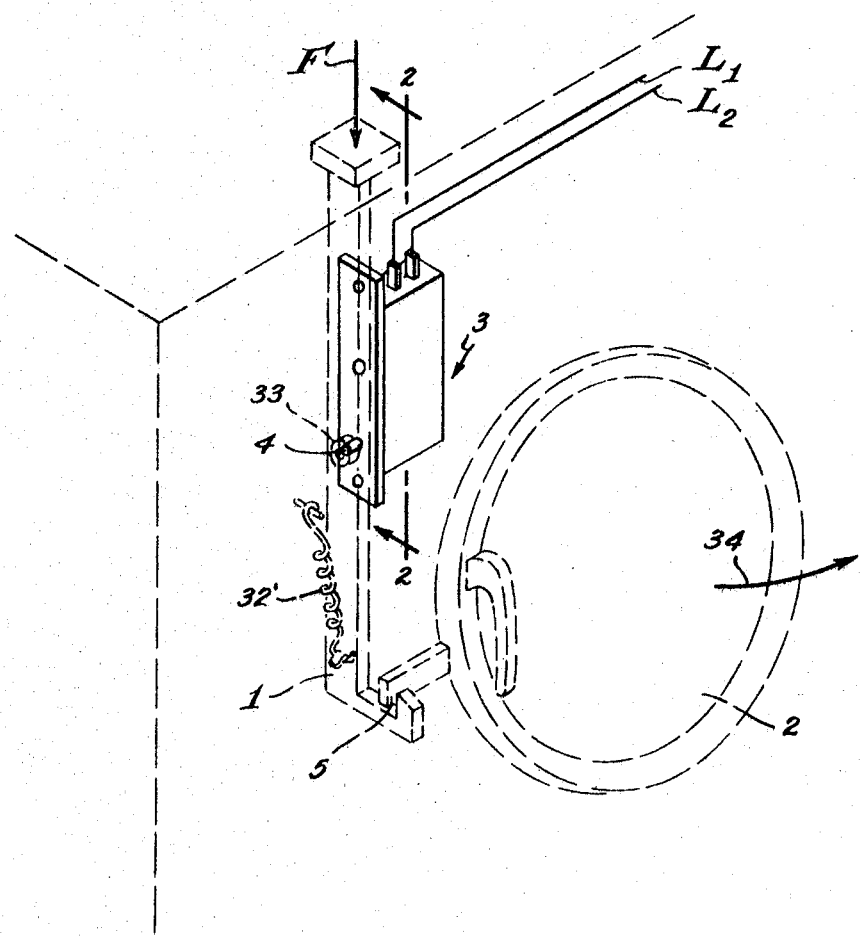

United States Patent Office 3,458,675
Patented July 29, 1969

3,458,675
SAFETY INTERLOCK FOR APPLIANCES
Italo Del Gaudio, Naples, Italy, assignor to Texas Instruments Incorporated, Dallas, Tex., a corporation of Delaware
Filed Nov. 30, 1966, Ser. No. 598,022
Claims priority, application Italy, Dec. 9, 1965, 27,293/65
Int. Cl. H01h 27/06, 61/06
U.S. Cl. 200—61.64
11 Claims

ABSTRACT OF THE DISCLOSURE

A safety interlock for appliances comprising a bolt movable to lock and unlock a door. A resistance heater causes deflection of a thermostatic element which in turn causes movement of the bolt. A smaller degree of deflection causes the resistance heater to cycle on and off without movement of the bolt to provide a predetermined time delay.

Background of the invention

The present invention relates to a safety device which directly prevents (without interposition of auxiliary members of the electrical, hydraulic or pneumatic type) an execution of a manual operation before a predetermined period of time has elapsed.

As is known in many cases, the rules of safety require that an operation should not be carried out before certain conditions, such as the decreasing of the speed of a rotating body, the lowering of the temperature of an enclosed space, are fulfilled.

A device of this type must be able to function also in case a lack of supply of energy, and must thus not drive auxiliary devices which then carry out the function required.

The device in question should further be independent of the ambient temperature and function by snap action.

These features are realized in the device according to the invention.

The present invention will now be described illustrating a preferred form of the invention which is given only by way of example and is in reference to the application of the device according to the invention to an automatic washing machine.

Summary

Safety interlock apparatus shown in conjunction with a washing machine door which comprises a movable bolt resiliently connected to a thermostatic member. A resistance heater is in heat transfer relation with and is mechanically connected to the thermostatic member and resiliently connected to a pair of contacts. The contacts are in the resistance heater circuit and the particular interconnections permit the heater to cycle on and off keeping the thermostatic member at a relatively constant temperature so that a predetermined time delay is achieved upon total deenergization of the electric motor of the washing machine. The resilient interconnection of the bolt and thermostatic member also prevents damage to the thermostatic member in the event that the bolt becomes locked in place.

Brief description of the drawing

FIG. 1 illustrates the application of a locking device 3 made in accordance with the instant invention in an automatic washing machine.

FIG. 2 is a cross section of device 3 taken on line 2—2 of FIG. 1 in the operating or locking position.

FIG. 3 is similar to FIG. 2, but partly diagrammatic, showing the operating mechanism in the resting or unlocking position.

Similar reference characters indicate corresponding parts throughout the several views of the drawings.

Description of the preferred embodiment

Referring now to the drawings, FIG. 1 shows a locking device 3 in accordance with the instant invention employed in a standard automatic washing machine. A door 2 of the washing machine is provided with a projecting latch 5 which interdigitates with arm 1. Spring 32' biases arm 1 upwardly toward a normal locking position in which arm 1 prevents the opening of door 2. Aperture 33 is provided in arm 1 into which bolt 4 is inserted when in the operating position. In this position movement of arm 1 is precluded. When bolt 4 is in the resting position arm 1 may be depressed by a force F thereby permitting door 2 to be opened as indicated by arrow 34.

The locking device 3 is connected to the power supply through lines $L_1$ and $L_2$ and the switch of the machine on which it is mounted. The moment the machine in question is started the resistance wire carries current. Wire 6 is wound around and is in heat transfer relation with the thermostatic element 7, herein shown as but not limited to a bimetallic element.

It will be noted that end 13 of wire 6 is electrically and mechanically connected to movable contact arm 14, as by soldering. Arm 14 formed of electrically conductive material having good spring qualities such as beryllium copper, mounts contact 9 which is adapted to engage and disengage with contact 10 mounted on stationary contact arm 15. Movable arm 14 is extended such that distal portion 16 mates with electrically insulative button 17 mounted on element 7. Deflection of bimetallic element 7 toward base 20, formed of electrical insulating material, will bias movable contact arm 14 through button 17 thereby separating contact 9 from stationary contact 10. Deflection of element 7 in the opposite direction will result in end 13 of wire 6 pulling movable arm 14 toward stationary arm 15 and eventual engagement of contacts 9 and 10.

A bore 21 is provided in base 20 in which is slidably received bolt 4. Notches or seats 12 and 12a are provided in bolt 4 to define the boundary positions of the sliding movement of bolt 4. These notches cooperate with ball 11 which is biased against bolt 4 by spring 24 seated in cavity 26 found in base 20. An aperture 22 is provided in bimetallic element 7 through which is loosely received bolt 4. Element 7 is resiliently connected to bolt 4 by means of spring 8 which is attached to bolt 4 by any convenient means, as by welding.

A threaded bore 28 is provided in base 20 to facilitate calibration of the device. An adjusting screw (not shown) is employed to apply a controlled force against stationary member 15 to thereby regulate the average steady state temperature of bimetallic element 7. Once regulated this screw may be encased in place with conventional potting material.

The heat generated by the heater wire 6 heats up the bimetal which, in undergoing a deflection proportional to the temperature, charges the spring 8 functioning by traction-tensile stress and compression.

When the spring exercises a sufficient force to overcome the resistance offered by the ball 11 the bolt 4 undergoes a sudden motion which brings it into the operating position (FIG. 2), thus locking mechanically the arm 1 which controls the opening latch 5 of the door 2 of the machine. The bimetal 7 which is resiliently joined to the bolt by spring 8 will proceed in its deflection until it opens the contacts 9 which then interrupts the feeding circuit of the resistance. The bimetal will then start to cool down and, in going through the movement in the opposite direction, will permit re-engagement of the contacts. The current will again start to flow and the cycle will repeat itself periodically thereby stabilizing bimetal 7 at a mean constant temperature for the entire time the device is connected. Bolt 4 will not follow these oscillations of bimetal 7 since its position is fixed by ball 11 which is engaged in groove 12 of the bolt. The minute the locking device is de-energized electrically bimetal 7 will start to cool down and will try to occupy the original form and to bring back bolt 4 into its resting position (FIG. 3).

When the force exercised by bimetal 7 on bolt 4 is such as to overcome the resistance exercised by ball 11 bolt 4 will spring into the resting position, freeing arm 1 which controls the opening of door 2 of the machine which can then be operated manually, as required.

It is important to note that due to the system of thermal stabilization of bimetal 7, described above, when de-energization of locking device 3 occurs, the bimetal itself will always be at approximately the same temperature therefore its return movement and consequent engagement of bolt 4 will always take place within a specific period of time. This constant period of time or delay is an integral part of the features of the aforedescribed apparatus preventing manual operation of the device to which it is coupled for a certain period of time, as necessary for restoring the necessary conditions of safety preliminary to the manual operation and to the consequent opening of the door 2 of the machine.

To insure optimum heat flow and to thereby shorten the off-time of the device, housing 30 is provided with opening 32, as seen best in FIG. 2.

The aforedescribed apparatus is self-protected against the possibility of a mechanical locking of the bolt for various reasons, which could result in a permanent damage of the bimetal and in an increase of the temperature of the apparatus above the predetermined limits of safety. The self-protection of the apparatus against such possibilities is achieved by the resilient coupling of bimetal 7 to bolt 4 by means of spring 8.

This resilient coupling permits in fact the normal movements of the bimetal and the cyclic opening and closing of contacts 9 and 10, with the consequent stabilization of the temperature of the bimetal itself even when bolt 4 is locked mechanically.

In view of the above, it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

I claim:
1. Safety interlock apparatus comprising (a) and electrically insulating base, (b) at least two terminal members supported on the base, (c) a thermostatic element which deflects upon changes in temperature cantilever mounted in the base, (d) a resistance heater wire having two ends wound about the thermostatic element, one end of the wire electrically connected to one of the terminal members, (e) a fixed contact mounted on the base and electrically connected to another of the terminals, (f) a movable contact arm cantilever mounted on the base, (g) a contact mounted on the movable contact arm and adapted to engage and disengage with the fixed contact, (h) the other end of the heater wire is electrically and mechanically connected to the movable contact arm, (i) a locking element movable between a locking and an unlocking position, (j) means to receive the locking element when in the locking position and (k) means connecting the locking element to the thermostatic element so that the position of the locking element in either the locking or the unlocking position will be dependent upon the deflection of the thermostatic element.

2. Apparatus according to claim 1 in which the movable arm is provided with an extended portion adapted to engage and disengage with the thermostatic element; deflection of the thermostatic element in one direction causes the resistance wire to pull the movable arm in a contacts engaging direction, and deflection of the thermostatic element in the opposite direction causes the thermostatic element to operate the movable arm and move it in a contacts disengaging direction.

3. Apparatus according to claim 2 in which the locking element is provided with notches and a movable member is mounted on the base and is biased against the locking element and is receivable in the notches thereby providing the locking and unlocking positions of the locking element.

4. Apparatus according to claim 3, in which the means connecting the thermostatic element to the locking element includes resilient means thereby permitting the contacts to engage and disengage without actuating movement of the locking element.

5. A safety door interlock comprising a bolt movable to locking and unlocking positions, means to receive the bolt when in the locking positions, a thermostatic element coupled to the bolt, resistance heater means mounted in heat transfer relation to the thermostatic element, and means to cycle the resistance heater on-and-off while the bolt is in the locking position.

6. An interlock according to claim 5 in which the means to cycle the resistance heater means on and off includes a stationary contact, a movable contact arm, a movable contact mounted on the movable contact arm and adapted to engage and disengage the stationary contact, the thermostatic element adapted to bias the movable contact arm in a contact disengagement direction upon sufficient movement of the thermostatic element in a first direction and means causing the movable contact arm to move in a contacts engagement direction upon sufficient movement of the thermostatic element in a second direction.

7. An interlock according to claim 6 in which the movable contact arm has two ends and is cantilever mounted, the movable contact is mounted on the movable contact arm intermediate the ends thereof and the thermostatic element upon sufficient movement in the first direction operates the distal end of the movable contact area.

8. An interlock according to claim 7 in which the resistance heater means comprises a heater wire wrapped around the thermostatic element and has an end connected to the movable contact arm so that upon sufficient movement of the thermostatic element in the second direction, the heater wire will pull the movable contact arm in a contact engagement direction.

9. A safety door interlock according to claim 5 in which the bolt is slidably mounted in a base member and is provided with at least two notches and biasing means is mounted in the base and is adapted to engage the notches as they come into alignment upon sliding movement of the bolt.

10. A safety door interlock according to claim 9 in which the thermostatic element is coupled to the bolt by means of a spring member to allow lost motion between the thermostatic element and the bolt.

11. A safety door interlock according to claim 6 in which means is provided to adjust the position of the stationary contact.

References Cited
UNITED STATES PATENTS

| | | | |
|---|---|---|---|
| 2,738,072 | 3/1956 | Knight | 210—360 |
| 2,539,185 | 1/1951 | Dayton | 310—4.1 |

ROBERT K. SCHAEFER, Primary Examiner

M. GINSBURG, Assistant Examiner

U.S. Cl. X.R.

337—92